United States Patent Office 3,113,966
Patented Dec. 10, 1963

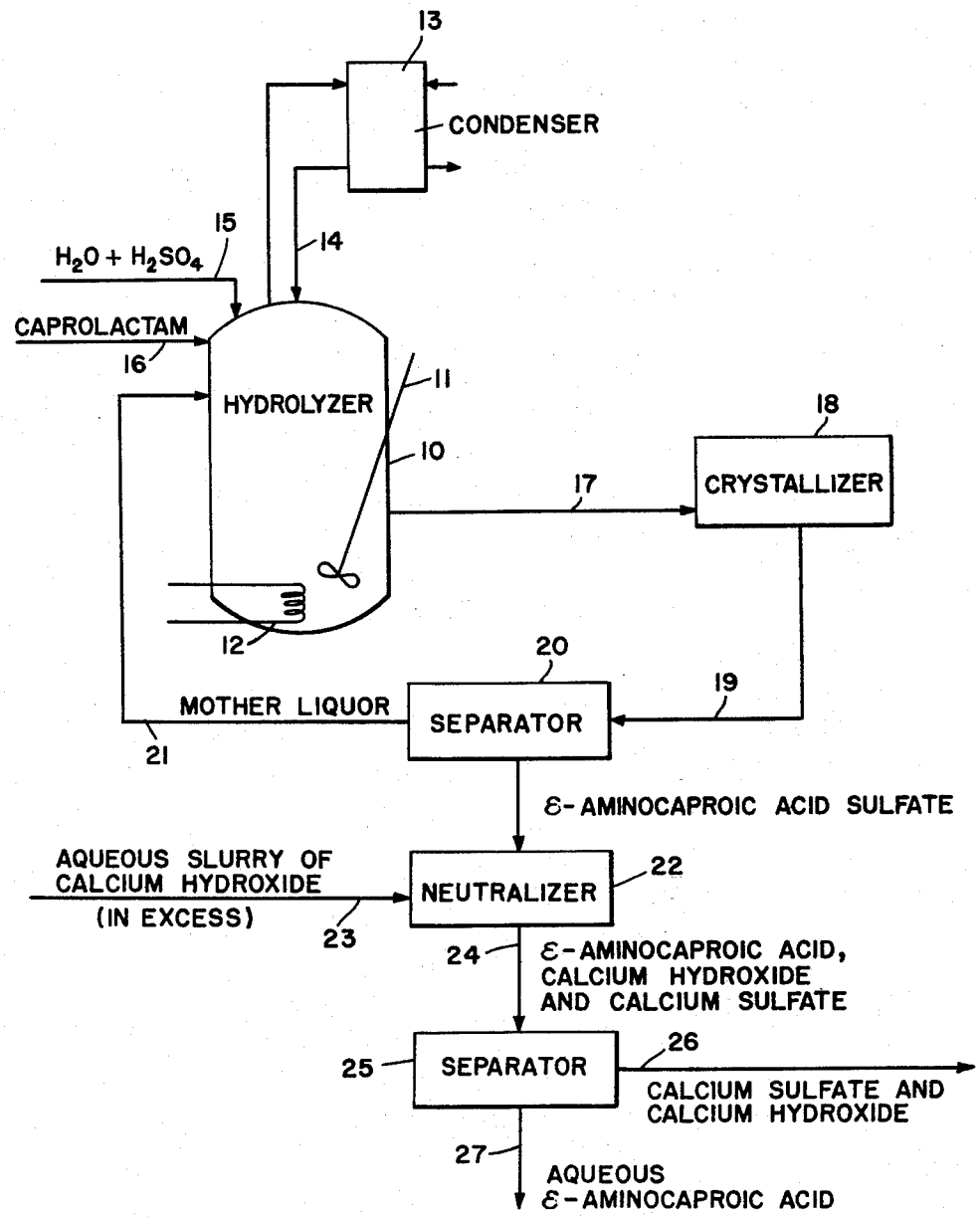

---

3,113,966
PROCESS OF HYDROLYZING CAPROLACTAMS
Robert L. Formaini, Petersburg, and Elvin K. Brakebill, Chester, Va., assignors to Allied Chemical Corporation, New York, N.Y., a corporation of New York
Filed Mar. 18, 1960, Ser. No. 15,855
5 Claims. (Cl. 260—534)

This invention relates to the hydrolysis of caprolactam, polycaprolactams, particularly in the form of fiber waste (nylon 6), or mixtures of caprolactam with polycaprolactams. The expressions "caprolactam" and "caprolactams" are used herein to refer to both the monomer and polymers. More particularly, this invention relates to the hydrolysis of caprolactams and subsequent treatment of the hydrolyzed reaction mixture to produce ε-aminocaproic acid useful, among other uses, as an intermediate in the production of L-lysine, an essential amino acid important in both animal and human nutrition.

All percentages herein are given on a weight basis.

The hydrolysis of lactams to form the corresponding amino carboxylic acids has been suggested. United States Patent 2,453,234, granted November 9, 1948, discloses that the hydrolysis of lactams with strong acids results in the formation of salt combinations with the amino groups of the amino carboxylic acids from which it is "extremely difficult" to recover the free amino carboxylic acids in pure form. British Patent 774,468 of 1957 refers to such process in which the lactams are hydrolyzed with sulfuric acid and the hydrolysis product is neutralized with an alkaline earth metal hydroxide, such as barium hydroxide, and states the amino acids free from salt are obtained by this procedure "with only poor yields."

It is among the objects of the present invention to provide a process of hydrolyzing caprolactams and neutralizing the hydrolysis product to produce ε-aminocaproic acid, which process results in high yields of the ε-aminocaproic acid.

It is another object of this invention to provide such process which is comparatively free of the difficulties involved in heretofore known procedures of treating caprolactams to produce the free amino carboxylic acids, particularly to minimize or eliminate the difficulties heretofore entailed in the isolation of the free amino acid from the neutralized reaction mixture.

Other objects and advantages of this invention will be apparent from the following detailed description thereof.

In accordance with this invention, a caprolactam or mixture of caprolactams, sulfuric acid and water, are mixed in a hydrolyzing zone in the proportions of from 1.2 to 2.5 mols of sulfuric acid (100% $H_2SO_4$) and from 1.5 to 6.0 mols of water per mol of caprolactam monomer, the mixture heated until substantially all of the caprolactam combines with the sulfuric acid to form ε-aminocaproic acid sulfate (containing 1 mol of sulfuric acid per mol of ε-aminocaproic acid), and the hydrolyzed reaction mixture cooled to precipitate or crystallize the bulk of the ε-aminocaproic acid sulfate. The solid ε-aminocaproic acid sulfate thus produced is separated from the liquid phase, and the latter recycled to the hydrolyzing zone, thus avoiding loss of the excess acid and of the ε-aminocaproic acid sulfate which remains dissolved in the liquid phase. The precipitated ε-aminocaproic acid sulfate is then neutralized with calcium hydroxide; calcium sulfate precipitates. The free ε-aminocaproic acid is separated from the calcium sulfate. An excess of calcium hydroxide over and above the stoichiometric amount required for reaction with the ε-aminocaproic acid sulfate is employed to assure complete neutralization of the ε-aminocaproic acid sulfate; from 1.3 to 2.2 times this stoichiometric amount of calcium hydroxide is used.

The mixture of caprolactam, sulfuric acid and water is heated to 100° to 200° C. to convert the caprolactam to ε-aminocaproic acid sulfate. The reaction mixture is cooled to 0° to 45° C. to crystallize the ε-aminocaproic acid sulfate containing about 1 mol of sulfuric acid per mol of ε-aminocaproic acid. The crystals are separated from the mother liquor and the latter recycled to the hydrolysis zone. The ε-aminocaproic acid sulfate crystals are neutralized with an aqueous slurry of calcium hydroxide to precipitate calcium sulfate, using an excess of calcium hydroxide as above noted.

Preferred operations involve mixing caprolactam, for reasons of economy in the form of waste from the manufacture of polycaprolactam, with sulfuric acid and water in the mol ratio of about 1.5 mols of sulfuric acid and about 2.8 mols of water per mol of caprolactam monomer and refluxing this mixture under agitation at atmospheric pressure for 4 to 9 hours. During this refluxing the temperature will rise from about 130° to 135° C. at the beginning of the reaction to about 150° to 155° C. at the completion. The clear hydrolyzate thus produced is then cooled to about 35° C., seeded with ε-aminocaproic acid sulfate crystals and slowly cooled to about 25° C. while mildly agitated. The resultant slurry or mixture is then filtered or subjected to centrifugal separation to separate the ε-aminocaproic acid sulfate from the filtrate or mother liquor. The mother liquor is recycled to the hydrolysis zone.

The ε-aminocaproic acid sulfate thus produced is soluble in water and alcohol, insoluble in acetone, and is hygroscopic.

The ε-aminocaproic acid sulfate is recovered by treating the filter cake from the separator with an aqueous slurry of calcium hydroxide at 50–100° C. The heat of neutralization furnishes a substantial portion of the heat. As noted, the neutralization mixture should contain about 1.3 to 2.2 times the stoichiometric amount of calcium hydroxide to precipitate all the acid as calcium sulfate. The water content of the mixture should be about 15 to 75 mols of water per mol of calcium hydroxide used. The resulting slurry is filtered at 50–100° C. to remove precipitated calcium sulfate and excess calcium hydroxide. The filtrate contains ε-aminocaproic acid together with small amounts of dissolved calcium sulfate and calcium hydroxide. The filter cake is slurried with water and again filtered to recover additional ε-aminocaproic acid. The filtrates are combined and treated with sufficient barium hydroxide to precipitate all sulfate ions as barium sulfate, which is very insoluble. The mixture is then treated with carbon dioxide at 80–100° C. to precipitate calcium and any excess barium ions as carbonates. Treatment with carbon dioxide is maintained for about 0.5–1 hour. Heating at 80–100° C. prevents formation of more soluble bicarbonates. The mixture is filtered hot and the residue washed with water. The filtrate with washings, containing ε-aminocaproic acid, is evaporated to near dryness and filtered. The crystalline product may be washed free of water with 2 parts of methanol per part of solid product. The ε-aminocaproic acid can then be dried at low temperatures below 100° C.

The process may be carried out batchwise or continuously. In the use of continuous operation, two or more hydrolyzers may be employed, each of sufficient capacity to give the hold-up time required to enable the hydrolysis reaction to go to completion.

The accompanying drawing is a flow sheet showing the steps of the process. In order to simplify the drawing, conventional pumps and flow control valves have not been indicated on this drawing.

In the drawing, 10 is a hydrolyzer equipped with an agitator 11, a heating coil 12 and communicating with a condenser 13 for condensing the overhead vapor. The condensate is returned to the hydrolyzer 10 through line 14. Hydrolyzer 10 is supplied with sulfuric acid and water through line 15 and caprolactam through line 16. The hydrolyzer may be fed with a solution of caprolactam in aqueous sulfuric acid through one or the other of lines 15 and 16.

The hydrolyzed reaction mixture is discharged from the hydrolyzer 10 through line 17 into crystallizer 18, where the reaction mixture is cooled to effect crystallization or precipitation of the ε-aminocaproic acid sulfate. The slurry produced in crystallizer 18 flows through line 19 into the separator 20 where separation of the crystals from the mother liquor takes place. The mother liquor is recycled through line 21 to the hydrolyzer 10. From the separator 20 the wet ε-aminocaproic acid sulfate flows into a neutralizer 22 supplied with an aqueous slurry of calcium hydroxide through line 23. The neutralized reaction mixture is discharged through line 24 into a separator 25 from which the precipitated calcium sulfate and excess calcium hydroxide is withdrawn through line 26 and the ε-aminocaproic acid product discharged through line 27.

The following examples are illustrative of the present invention. It will be understood the invention is not limited to these examples. In the examples all parts and percentages are given on a weight basis.

EXAMPLE I

Part 1

927 parts of a solution of caprolactam (the monomer) in aqueous sulfuric acid containing the reactant constituents in a mol ratio of 1.5 mols of sulfuric acid and 2.8 mols of water per mol of caprolactam was heated with agitation at atmospheric pressure for four hours under reflux conditions. The temperature rose during the reaction from 134° to 152° C. The clear hydrolyzate thus produced was then cooled to 35° C., seeded with 0.1 part of ε-aminoscaproic acid sulfate crystals and while mildly agitating, cooled to 25° C. The resultant slurry was filtered, yielding 405 parts of wet solids, analyzing 51.4% ε-aminocaproic acid, 44.4% sulfuric acid, and 3.3% water, and 522 parts of filtrate analyzing 33.6% ε-aminocaproic acid, 49.4% sulfuric acid and 16.4% water.

For analysis, a small portion of the wet crystals were washed five consecutive times with acetone, using five volumes of acetone per volume of crystals in each treatment to remove all mother liquor. The crystals were filtered from the mixture, and dried in a vacuum oven to constant weight. The dried product analyzed 56.0% ε-aminocaproic acid and 44.0% sulfuric acid; theoretical for ε-aminocaproic acid sulfate containing 1 mol of sulfuric acid is 57.2% ε-aminocaproic acid and 42.8% sulfuric acid.

Part 2

522 parts of the filtrate were recycled to the hydrolyzer and mixed with 328 parts of a solution of caprolactam in aqueous sulfuric acid producing 850 parts of a mixture containing 1.5 mols of sulfuric acid, 2.8 mols of water per mol of caprolactam. This mixture was processed as hereinabove described in connection with Part 1.

The ε-aminocaproic acid sulfate thus produced in Parts 1 and 2 was mixed 3500 parts of an aqueous slurry of calcium hydroxide containing 250 parts calcium hydroxide. 548 parts of wet solids containing excess calcium hydroxide and the calcium sulfate precipitate thus produced was separated from the ε-aminocaproic acid by filtration. The wet filter cake was slurried in water and again filtered. The filtrates were combined and treated at about 90° C. to separate small amounts of calcium and sulfate ions. First, 17 parts of barium hydroxide was added to precipitate barium sulfate; then carbon dioxide was passed through the mixture to precipitate barium and calcium as carbonates. The resulting mixture was filtered to produce a solution of pure ε-aminocaproic acid. This solution was concentrated to crystallize the ε-aminocaproic acid; the crystals were filtered off, washed with methanol to facilitate drying, and dried.

On the basis of both parts of this example, the recovery of free ε-aminocaproic acid based on the caprolactam treated was 85%. This yield, of course, increases with the number of recycles of the mother liquor to the hydrolyzer zone. A yield of 95 mol percent ε-aminocaproic acid based on the caprolactam processed is obtainable.

No difficulties were encountered in effecting the neutralization of the ε-aminocaproic acid sulfate and the recovery of the free ε-aminocaproic acid.

EXAMPLE II

This example differs from Example I in that polycaprolactam fiber waste containing about 98.5% caprolactam-bearing materials was employed. 56.5 parts of fiber waste were refluxed with aqueous sulfuric acid (74.5% of concentration) to produce a mixture (155 parts) containing 1.5 mols of sulfuric acid and 2.8 mols of water per mol of caprolactam (the monomer). This mixture was refluxed for nine hours. The temperature rose from 109° C. when refluxing began to 144° C. towards the end of the nine hour period.

The hydrolysis reaction mixture was then cooled and further processed as in Example I. ε-aminocaproic acid sulfate was obtained analyzing 57.7% ε-aminocaproic acid and 42.6% $H_2SO_4$, identical with the ε-aminocaproic acid sulfate obtained in Example I.

Free ε-aminocaproic acid was obtained from the sulfate by neutralizing with calcium hydroxide in the same manner as described above in connection with Example I. No difficulties in effecting this isolation were encountered. The yields of free ε-aminocaproic acid are comparable with those obtained in Example I; yields as high as 90 mol percent based on fiber processed are obtainable.

It will be noted the present invention provides a process of hydrolyzing caprolactams and neutralizing the ε-aminocaproic acid sulfate thus produced to give high yields of the free ε-aminocaproic acid. In that the ε-aminocaproic acid sulfate is precipitated or crystallized from the hydrolyzed reaction mixture, the liquid phase containing the excess acid and dissolved ε-aminocaproic acid sulfate recycled to the hydrolysis zone, little loss of the ε-aminocaproic acid sulfate takes place, and moreover the excess acid is beneficially utilized. Moreover, only the ε-aminocaproic acid sulfate which separates out in the solid phase, in accordance with the present invention, is treated with calcium hydroxide to neutralize the acid and produce the free ε-aminocaproic acid. Surprisingly, this feature of the process results not only in a material saving in the amount of calcium hydroxide required to effect the neutralization, but also minimizes, if not completely eliminates, the difficulties heretofore encountered in effecting this neutralization. Surprisingly, the isolation of the amino acid from the solid phase material, e.g., filter cake produced when separating the crystallized or precipitated ε-aminocaproic acid sulfate from the liquid phase, does not present the difficulties entailed in recovering the free ε-aminocaproic acid from the hydrolyzed reaction mixture as heretofore processed. Based on the free ε-aminocaproic acid produced, in the present invention approximately 125% calcium hydroxide is required to neutralize the ε-aminocaproic acid sulfate; this represents a saving of approximately 50% as compared with the amount required in neutralizing the hydrolysis reaction mixture in accordance with prior known procedures such, for example, as that referred to in the aforementioned British Patent 774,468.

While the invention has been described above as carried out under atmospheric pressure conditions, it will be understood that super-atmospheric pressure conditions, desirably relatively low, say of the order of from 20 to 200 p.s.i.g., for reasons of economy, may be employed. By carrying out the hydrolysis under autogenous pressure at a temperature of from 180° to 200° C., the time for effecting the hydrolysis reaction is effectively reduced.

Since certain changes may be made in carrying out the above described method of hydrolyzing caprolactams and recovering free ε-aminocaproic acid from the hydrolyzed reaction mixture without departing from the scope of this invention, it is intended that all matter contained in the above description or shown in the accompanying drawing shall be interpreted as illustrative and not in a limiting sense.

What is claimed is:

1. The process of hydrolyzing caprolactam which comprises the following steps: step 1, mixing the caprolactam with water and sulfuric acid in the proportions of from 1.2 to 2.5 mols of sulfuric acid and from 1.5 to 6.0 mols of water per mol of caprolactam calculated on a monomeric basis; step 2, heating the mixture to form ε-aminocaproic acid sulfate containing 1 mol of sulfuric acid per mol of ε-aminocaproic acid; step 3, cooling the reaction mixture produced in step 2 to precipitate the bulk of the ε-aminocaproic acid sulfate as a solid phase; and, step 4, separating the ε-aminocaproic acid sulfate from the remainder of the reaction mixture formed in step 3, and passing the remainder of the reaction mixture from which the solid ε-aminocaproic acid sulfate has been separated to step 1 of the process for utilization in producing the reaction mixture containing from 1.2 to 2.5 mols of sulfuric acid and from 1.5 to 6.0 mols of water per mol of caprolactam calculated on a monomeric basis.

2. The process of hydrolyzing caprolactam as defined in claim 1, in which in step 2 the reaction mixture is refluxed to form the ε-aminocaproic acid sulfate, and in step 3 the reaction mixture is cooled to about 25° C. to effect the precipitation of the bulk of the ε-aminocaproic acid sulfate as a solid phase.

3. The process of converting caprolactam to ε-aminocaproic acid which comprises the following steps: step 1, mixing caprolactam, sulfuric acid and water in the proportions of from 1.2 to 2.5 mols of sulfuric acid and from 1.5 to 6.0 mols of water per mol of caprolactam and heating this mixture to a temperature of from 100° to 200° C. to convert the caprolactam to ε-aminocaproic acid sulfate containing 1 mol of sulfuric acid per mol of ε-aminocaproic acid; step 2, cooling the reaction mixture to from 0° to 45° C. to crystallize the ε-aminocaproic acid sulfate; step 3, separating the crystallized ε-aminocaproic acid sulfate from the mother liquor and recycling the mother liquor to step 1; step 4, neutralizing the ε-aminocaproic acid sulfate with an aqueous slurry of calcium hydroxide to precipitate calcium sulfate and produce an aqueous solution of the ε-aminocaproic acid; and, step 5, separating the precipitated calcium sulfate from the ε-aminocaproic acid solution.

4. The process of converting caprolactam to ε-aminocaproic acid which comprises the following steps: step 1, mixing caprolactam, sulfuric acid and water in the proportions of about 1.5 mols of sulfuric acid and about 2.8 mols of water per mol of caprolactam and refluxing this mixture to convert the caprolactam to ε-aminocaproic acid sulfate containing 1 mol of sulfuric acid per mol of ε-aminocaproic acid; step 2, cooling the reaction mixture to from 0° to 45° C. to crystallize the ε-aminocaproic acid sulfate; step 3, separating the crystallized ε-aminocaproic acid sulfate from the mother liquor and recycling the mother liquor to step 1; step 4, neutralizing the ε-aminocaproic acid sulfate with an aqueous slurry of calcium hydroxide to precipitate calcium sulfate and produce an aqueous solution of the ε-aminocaproic acid; and step 5, separating the calcium sulfate precipitate from the ε-aminocaproic acid solution.

5. The process as defined in claim 4 in which the caprolactam subjected to hydrolysis is polycaprolactam fiber waste produced in the manufacture of nylon-6.

References Cited in the file of this patent

UNITED STATES PATENTS

| | | |
|---|---|---|
| 2,327,119 | Martin | Feb. 6, 1941 |
| 2,356,702 | Schlack | Aug. 22, 1944 |
| 2,453,234 | Koch | Nov. 9, 1948 |
| 2,579,851 | Novotny | Dec. 25, 1951 |